United States Patent [19]

Weber et al.

[11] Patent Number: 4,963,170
[45] Date of Patent: Oct. 16, 1990

[54] INFLOW AND OUTFLOW HEPA VENT FILTER FOR ASBESTOS WORK AREAS

[75] Inventors: John E. Weber, Oakland; Lee C. Conrad, Burbank, both of Calif.

[73] Assignee: Global Consumer Services, Inc., Burbank, Calif.

[21] Appl. No.: 445,352

[22] Filed: Dec. 4, 1989

[51] Int. Cl.⁵ .................................. B01D 46/42
[52] U.S. Cl. .................... 55/311; 55/385.2; 55/493; 55/502; 98/115.4
[58] Field of Search ................... 55/309–311, 55/502, 467, 473, 493, 385.2; 98/115.4; 137/526, 547

[56] References Cited

U.S. PATENT DOCUMENTS

| | | | |
|---|---|---|---|
| 2,575,499 | 11/1951 | Manow | 55/493 |
| 3,360,910 | 1/1968 | Soltis | 55/502 |
| 3,756,416 | 9/1973 | Wood | 210/408 |
| 4,217,116 | 8/1980 | Seever | 55/96 |
| 4,312,645 | 1/1982 | Mavros et al. | 55/213 |
| 4,604,111 | 8/1986 | Natale | 55/467 |
| 4,682,993 | 7/1987 | Todd | 55/314 |
| 4,698,078 | 10/1987 | Mavros | 55/493 |
| 4,778,496 | 10/1988 | Conrad | 55/472 |
| 4,854,950 | 8/1989 | Kiervowski et al. | 55/309 |

Primary Examiner—Bernard Nozick
Attorney, Agent, or Firm—Harpman & Harpman

[57] ABSTRACT

A HEPA vent filter device comprising a housing having openings in front and back walls, a partition in said housing between said front and back walls positioned at an angle from vertical and defining a framed opening, extensible curtain walls on the exterior of said housing between said front and back walls, a HEPA filter, pivots mounting said HEPA filter for movement toward and away from said framed opening so that air passing through said housing in a first direction moves said HEPA filter away from said framed opening and air passing through said housing in the opposite direction moves said HEPA filter into engagement with said framed opening and a sealing gasket thereon.

8 Claims, 2 Drawing Sheets

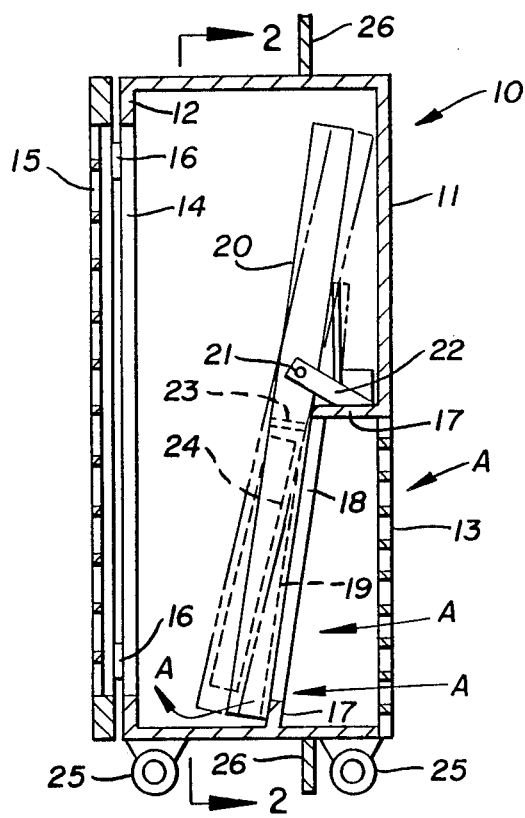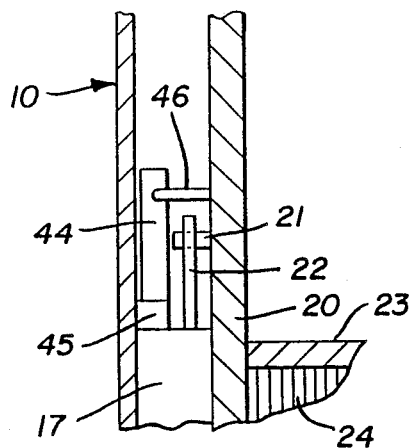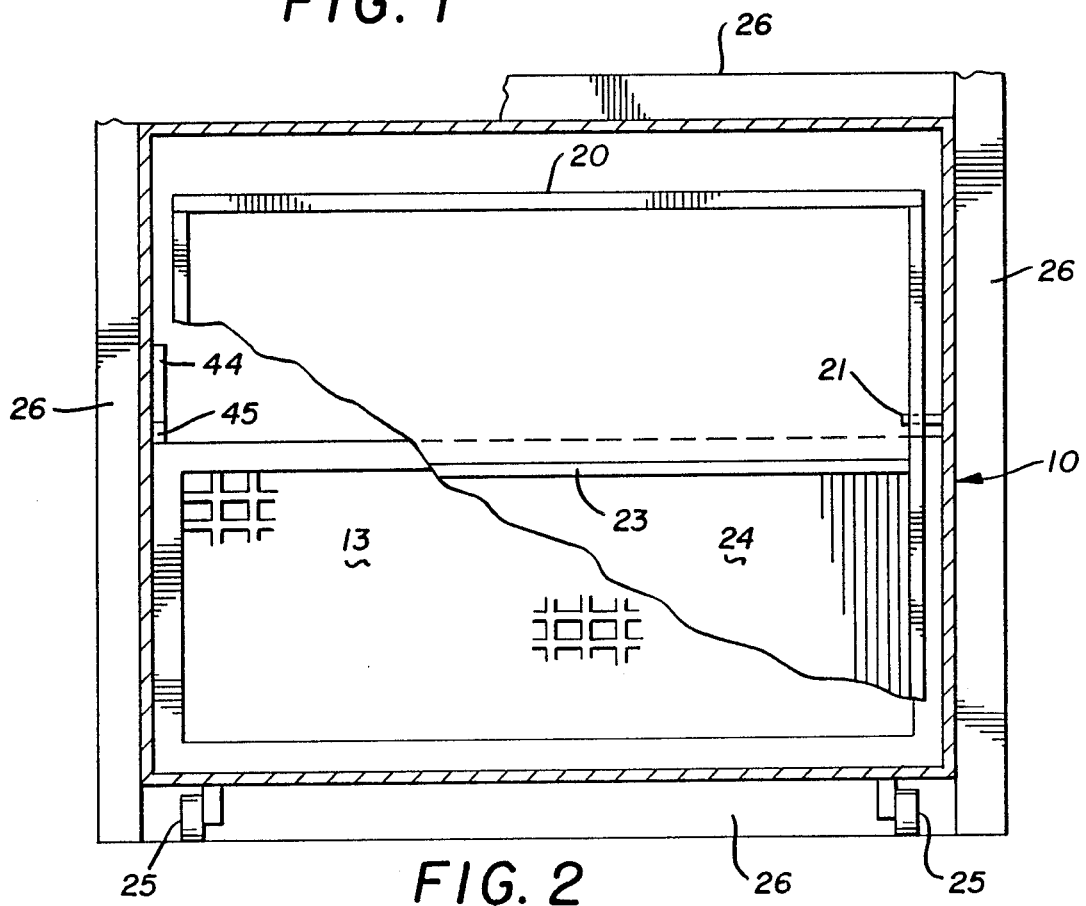

INFLOW AND OUTFLOW HEPA VENT FILTER FOR ASBESTOS WORK AREAS

BACKGROUND OF THE INVENTION

1. Technical Field:

In areas such as work spaces contaminated with friable articles such as asbestos fibers during asbestos removal therein, it is essential that no air-borne particles such as the friable asbestos fibers leave the work area.

2. Description of the Prior Art:

Prior to the present invention, this has been facilitated by providing overlapping polyethylene sheets between the work area and adjacent areas including decontamination areas by providing overlapping polyethylene sheets between the decontamination area and the work area. Air moving into the work area responsive to the operation of negative air machines communicating therewith moves through the overlapping plastic sheets which usually also provide means for personal entering and leaving the work area. The overlapping plastic sheets are so arranged that at any time the negative air pressure in the work area is lost, the sheets preclude ambient air in the work area from passing out of the work area and insure against a positive pressure occurring in the work area causing contaminated air from the work area passing outwardly therefrom.

The present invention relates to an inflow and outflow HEPA vent filter device positioned in the air inlet to the work area which is usually in communication with a decontamination area. Air entering and air exiting the work area through the air inlet must pass through the device and therefore the air-borne friable asbestos particles or the like are removed and the decontamination or other areas around the work area not contaminated with the friable asbestos fibers.

SUMNMARY OF THE INYENTION

An inflow and outflow HEPA vent filter device comprises a housing having inlet and outlet openings in its front and back walls and a HEPA filter movably positioned therebetween for movement into and out of an air path therethrough. Extending curtain flanges on its sides and upper and lower surfaces enable the HEPA vent filter device to be positioned in an opening comprising an air inlet to a work area so as to control air moving through said opening. The HEPA filter in the device is movable in the manner of a check value toward and away from the framed opening in a partition in the HEPA vent filter device positioned between screened openings in the front and back walls of the device, the HEPA filter being pivotally mounted so as to move into engagement with the framed opening by gravity so as to control air from a work area moving through the HEPA vent filter device responsive to an increase of air pressure in the work area and so as to permit the HEPA filter to move away from the framed opening as in normal operation where air is flowing into the work area through the device responsive to negative air pressure in the work area as occasioned by the operation of negative air machines therein.

DESCRIPTION OF THE DRAWINGS

FIG. 1 is a vertical section through the HEPA vent filter device with broken lines illustrating an alternate position of the HEPA filter;

FIG. 2 is a vertical section on line 2-2 of FIG. 1;

FIG. 3 is an enlarged detail of a spring mechanism urging the HEPA filter in one direction;

DESCRIPTION OF THE PREFERRED EMBODIMENT

Figure 4:
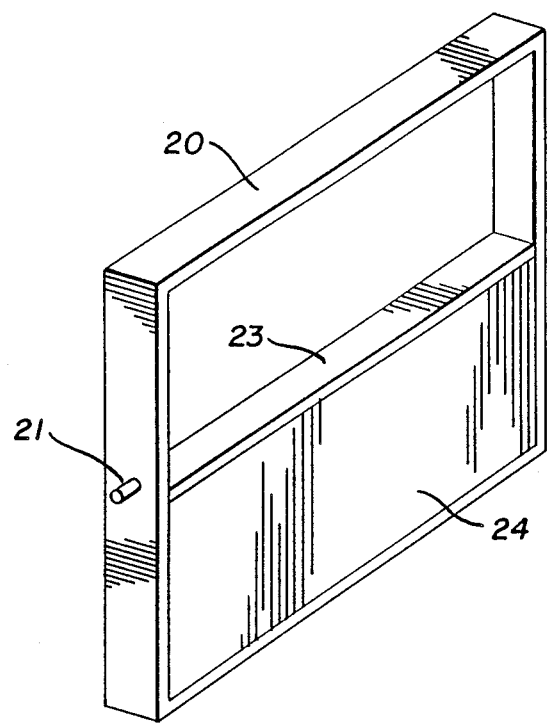
FIG. 4 is a perspective elevation of the HEPA filter and mounting frame of FIGS. 1 and 2.

One form of the invention for accomplishing the desired results is illustrated in FIGS. 1-4 of the drawings. In this embodiment, a housing 10 has a front wall 11 and a back wall 12, the front wall 11 having a screened inlet opening 13 and the back wall 12 having an inturned flange 14 defining an outlet opening together with a screened door 15 secured thereto by hinges 16. A partition 17 spaced inwardly of the inlet opening 13 defines a secondary frame 18 including an inturned flange 19 which defines a secondary inlet opening. A frame 20 pivoted about pivot pins 21 is positioned in the housing 10 and supported by the pivot pins 21 engaging arms 22 extending into the housing from the partition 17 adjacent the front wall 11 of the housing. The top part of the frame 20 may be a void separated from the lower part by a frame member 23. A HEPA filter 24 is positioned in the lower portion of the frame 20. The upper portion of the frame 20 acts as a counter weight with respect to the weight of the HEPA filter 24.

When the HEPA vent filter device is positioned in an air inlet to a work area in which asbestos is being removed and from which air is being evacuated by negative air pressure machines, air A flows through the inlet opening 13 in the housing 10 and through the secondary opening defined by the inturned flange 19 around the secondary opening in the partition 17 and causes the frame 20 and the HEPA filter 24 in the lower part thereof to pivot in the direction of the arrows A in FIG. 1 so that a large volume of air may flow into the housing 10 and into a work area with which the opening in the back wall 12 of the housing 10 communicates by way of the screen door 15. The mounting of the HEPA filter 24 in the frame 20 by way of the pivot pins 21 in the openings in the arms 22 is such that although the HEPA filter wall move out of the way as in the broken line position in FIG. 1 of the drawings as a result of airflow A due to normal negative air pressure which is about 0.02 inches water below-atmospheric in the work area, it will be understood that if the air flow A stops, the HEPA filter 24 will quickly move back to the position illustrated in solid lines in FIG. 1 of the drawings so that any air from the work area will be required to pass through the HEPA filter 24 to exit the work space through the inlet opening in which the HEPA vent filter device is positioned. The work area is enclosed by walls.

Wheels 25 may be provided for the housing 10 if desired and it will be understood that while in operation curtain walls 26 are positioned on the sides, top and bottom of the housing 10 so as to completely close the air inlet opening in which the HEPA vent filter device is positioned. When the curtain walls 26 are removed at such time as asbestos removal is completed in the work area, the HEPA vent filter device may be easily moved to another location.

Figure 5:
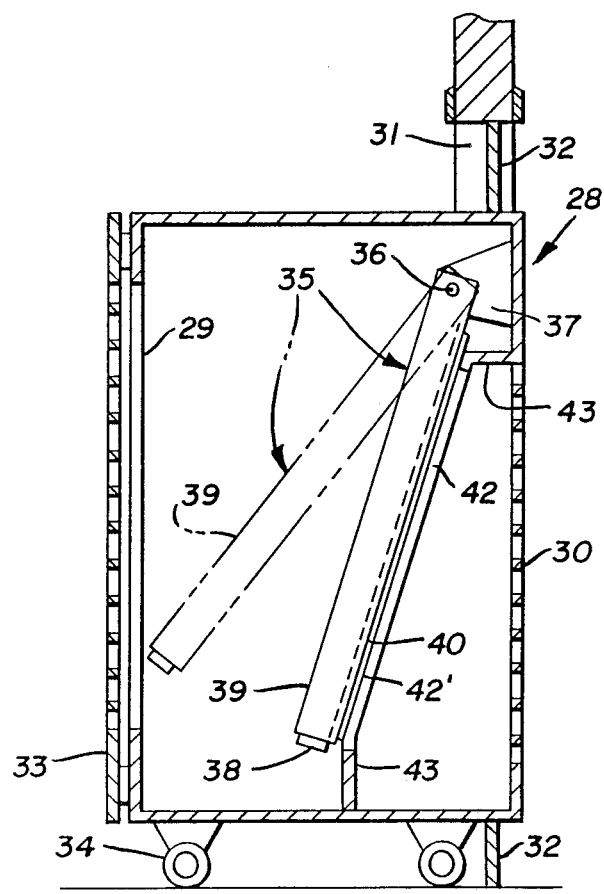
FIG. 5 is a vertical section through a modification of the HEPA vent filter device.

It will occur to those skilled in the art that the HEPA vent filter device of the invention may take alternate forms and one such form may be seen by referring to FIG. 5 of the drawings in which a housing 28 is illustrated in vertical section having an access opening 29 for communication with a work area and a screened opening 30 communicating with a decontamination chamber or other clean air area separated from the work area.

In FIG. 5 of the drawings, the housing 28 is shown positioned in a doorway 31 and provided with extensible curtain flanges 32 which close the doorway which forms the air inlet to the work area concerned. The access opening 29 is preferably provided with a screen door 33 and wheels 34 may be positioned on the housing 28 so that it can be wheeled from one work area to another as desired. A single relatively large HEPA filter unit 35 is pivotally mounted on pivot pins 36 engaging brackets 37 in the housing 28 and is preferably provided with a weight 38 on its lowermost end.

The HEPA unit comprises a frame 39 which encloses the actual HEPA filter and the frame 39 has a soft resilient gasket 40 on the surface thereof opposed to the screened opening 30. By referring to FIG. 6 of the drawings, an enlarged detail of the frame 39 and the HEPA unit therein, it will be seen that the frame 39 carries the resilient gasket 40 which may be of rubber, resin or foamed plastic material, etc. and that the HEPA filter unit 41 is positioned in the frame 39 so that any air entering the housing 28 as indicated by the arrows A will engage the same and will either flow through the HEPA filter unit 41 or create sufficient inlet pressure to move the frame 39 to the position shown in broken lines in FIG. 5.

It will also be seen that when and if the normally subatmospheric or negative air pressure in the work area is discontinued, the angular positioning of the HEPA filter frame 39 and filter 41 and se 40 will move by gravity into engagement with a framed opening 42 in a partition 43 in the housing 28 and which framed opening 42 has a thin inturned sealing flange 42' that will sealingly engage the soft yielding deformable sealing gasket 40. It will occur to those skilled in the art that air from the work area which may contain friable asbestos fibers and moving as indicated by the arrows B in FIG. 5 toward the normal air inlet defined by the housing 28 must pass through the HEPA filter unit 41 in order to exit the work area.

Figure 6:
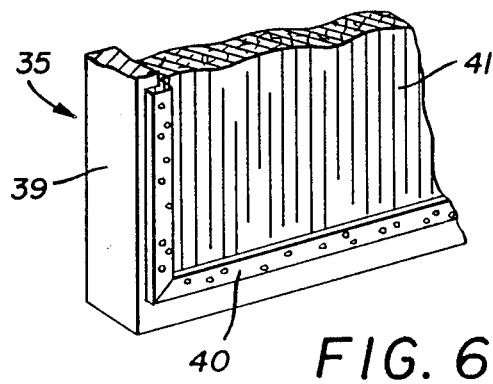
FIG. 6 is an enlarged detail of the HEPA frame in FIG. 5.

It will occur to those skilled in the art that if desired a spring powered device may be incorporated in the form of the invention hereinbefore disclosed in connection with FIGS. 1–4 of the drawings as well as the form of the invention illustrated in FIGS. 5 and 6 of the drawings and as illustrated for example in FIG. 3 of the drawings wherein a leaf spring 44 is positioned on a spring bracket 45 with one end of the leaf spring secured thereto and the other extending upwardly thereof and engaging a pin 46 on the frame 20 of the HEPA filter unit as used in connection with the frame 20 as used in the form of the invention illustrated in FIGS. 1–4 of the drawings. The spring on the bracket 45 provides additional assurance that the HEPA filter 20 will move into engagement with the secondary frame 18 defining the opening in the partition 17 of the housing 10 and heretofore described. The same sealing construction is preferably employed on the pivotally supported HEPA filter units of both forms of the invention so as to insure a sealing relation between the HEPA unit, its frame and the framed opening in the partitions 17 and 43, respectively.

Those skilled in the art will observe that movable filters of one sort or another have been heretofore known in the filtering art, for example in U.S. Pat. No. 3,756,416 of Sept., 1973 a vertically movable filter panel is disclosed which is moved by a mechanism responsive to a pressure drop sensor so as to open or close a passageway through which particulate material may be air-borne.

In U.S. Pat. No. 4,217,116 of Aug. 1980, a filter panel is selectively moved out of its normal position extending across a fluid passage to a dumping position out of the fluid passageway in combination with an imperforate baffle plate which is moved into the passageway to block flow therethrough while the filter panel is out of the passageway.

U.S. Pat. No. 4,312,645 of Jan., 1982 discloses a filter unit pivotally supported in an air intake duct utilizing a differential pressure switch to actuate a latch securing the filter in a predetermined position and freeing it to move into a bypass position.

U.S. Pat. No. 4,682,993 of Jul. 1987 locates a replaceable filter cartridge in a sliding filter tray in a housing plenum so as to be movable in the housing to a position where it will open a spring biased valve gate controlling air flow through the device.

The present invention differs from the known prior art in the disclosure of a portable highly efficient device for controlling air entering and leaving a work area in which hazardous particulates such as friable asbestos are air-borne as in the case of an asbestos removable operation the work area being maintained at sub-atmospheric pressure by negative air machines continuously exhausting air from the work area and therefore requiring inlet air to replace that exhausted.

The device of the invention is readily positioned in a doorway or other opening forming an air inlet to the work area and functions automatically in permitting air to enter the work area with a minimum of obstruction and at the same time prevent exit of contaminated air from the work area and any air-borne particulate material such as friable asbestos fibers and the like, the structure and the function of the device being novel in the art and having thus described my invention what I claim is:

1. A HEPA vent filter device for temporary positioning in an air inlet to work area separated by walls from a clean area, said air being normally caused to flow through said device in a first direction into said work area from said clean area; said device comprising a housing having openings in front and back walls, extensible curtain walls on the exterior of said housing between said front and back walls, a HEPA filter, pivot means mounting said HEPA filter in said housing between said front and back walls, partition in said housing between said front and back walls positioned at an angle from vertical and defining a framed opening, said HEPA filter positioned for movement between a first position spaced with respect to said framed opeining in which the air passing through said housing in a first direction from said clean area to said work area by-passes said HEPA filter to a second position engaging said framed opening in which air passing through said housing from said work area to said clean area passes through said HEPA filter.

2. The HEPA vent filter device set forth in claim 1 and wherein a frame is positioned around said HEPA filter, a portion of said frame extending above said HEPA filter, said pivot means engaging said portion of said frame above said HEPA filter.

3. The HEPA vent filter device set forth in claim 1 wherein said partition in said housing defining said framed opening is arranged with its uppermost portion adjacent said front wall of said housing and its lowermost portion is spaced inwardly of said front wall of said housing.

4. The HEPA vent filter device set forth in claim 1 wherein said partition in said housing defining said framed opening is arranged with its upper end portion adjacent said front wall of said housing and its lowermost portion is spaced inwardly of said front wall of said housing and wherein said pivot means is positioned adjacent said front wall of said housing above said upper end of said partition defining said framed opening whereby said HEPA filter is movably positioned at an angle from vertical matching said angle of said framed opening.

5. The HEPA vent filter device set forth in claim 1 and wherein an outturned flange is formed on said partition adjacent said framed opening therein and a resilient deformable gasket is positioned on said HEPA filter for engagement with said outturned flange when said HEPA filter is in said second position.

6. The HEPA vent filter device set forth in claim 1 and wherein curtain walls are positioned around said housing so as to engage said housing and said air inlet.

7. The HEPA vent filter set forth in claim 1 and wherein at least one weight is attached to said HEPA filter below said pivot means.

8. The HEPA vent filter device set forth in claim 1 and wherein spring means is positioned in said housing engaging said HEPA filter so as to urge said HEPA filter toward said second position engaging said framed opening.

* * * * *